United States Patent
Zhou et al.

(10) Patent No.: US 12,477,363 B2
(45) Date of Patent: Nov. 18, 2025

(54) PDCCH MONITORING AND APPARATUS, AND STORAGE MEDIUM AND TERMINAL

(71) Applicant: SPREADTRUM COMMUNICATIONS (SHANGHAI) CO., LTD., Shanghai (CN)

(72) Inventors: Huayu Zhou, Shanghai (CN); Zhengang Pan, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 523 days.

(21) Appl. No.: 17/775,035

(22) PCT Filed: Sep. 17, 2020

(86) PCT No.: PCT/CN2020/115713
§ 371 (c)(1),
(2) Date: May 6, 2022

(87) PCT Pub. No.: WO2021/088522
PCT Pub. Date: May 14, 2021

(65) Prior Publication Data
US 2022/0394521 A1    Dec. 8, 2022

(30) Foreign Application Priority Data
Nov. 8, 2019    (CN) .......................... 201911097503.4

(51) Int. Cl.
*H04W 24/08* (2009.01)
*H04W 72/0446* (2023.01)
*H04W 72/23* (2023.01)

(52) U.S. Cl.
CPC ....... *H04W 24/08* (2013.01); *H04W 72/0446* (2013.01); *H04W 72/23* (2023.01)

(58) Field of Classification Search
CPC . H04W 24/08; H04W 72/0446; H04W 72/23; H04L 5/0046; H04L 5/0053; H04B 17/30
See application file for complete search history.

(56) References Cited

U.S. PATENT DOCUMENTS

2018/0227156 A1   8/2018  Papasakellariou
2018/0288747 A1   10/2018 Sun et al.
(Continued)

FOREIGN PATENT DOCUMENTS

CN    109587710 A    4/2019
CN    110352578 A    10/2019
(Continued)

OTHER PUBLICATIONS

APT, MTI, OPPO, Convida Wireless, "Clarification of PDCCH monitoring within CORSET duration" 3GPP TSG-RAN WG2 Meeting NR #101, Athens, Greece, Feb. 26-Mar. 2, 2018, R2-1801880, 8 pages.
(Continued)

*Primary Examiner* — Sun Jong Kim
(74) *Attorney, Agent, or Firm* — CANTOR COLBURN LLP

(57) ABSTRACT

A PDCCH monitoring method and apparatus, and a storage medium and a terminal are provided. The method comprises: monitoring a PDCCH in a first type of Control Resource Set (CORESET), or a PDCCH in resources where Control Channel Element (CCE) indexes are concatenated in a plurality of CORESETs.

4 Claims, 1 Drawing Sheet monitoring a PDCCH in a first type of CORESET, or a PDCCH in resources where CCE indexes are concatenated in a plurality of CORESETs — S101

(56) References Cited

U.S. PATENT DOCUMENTS

| | | | |
|---|---|---|---|
| 2019/0069276 A1* | 2/2019 | Kwak | H04L 1/00 |
| 2019/0158205 A1 | 5/2019 | Sheng et al. | |
| 2019/0357183 A1 | 11/2019 | Takeda et al. | |
| 2020/0053757 A1* | 2/2020 | Bagheri | H04L 5/0058 |
| 2020/0068591 A1* | 2/2020 | Xu | H04L 5/0053 |
| 2020/0245332 A1 | 7/2020 | Ji et al. | |
| 2021/0195569 A1* | 6/2021 | Horiuchi | H04L 5/0094 |
| 2022/0159680 A1* | 5/2022 | Zheng | H04W 72/1263 |

FOREIGN PATENT DOCUMENTS

| | | |
|---|---|---|
| CN | 110784927 A | 2/2020 |
| EP | 3681115 A1 | 7/2020 |
| WO | 2018128184 A1 | 7/2018 |
| WO | 2018201877 A1 | 11/2018 |
| WO | 2019029528 A1 | 2/2019 |
| WO | 2019049281 A1 | 3/2019 |

OTHER PUBLICATIONS

JPO Notice of Reasons for Refusal for corresponding JP Application No. 2022-526412; mailed Nov. 21, 2023, 8 pages.
International Search Report for International Application No. PCT/CN2020/115713; Mailing date, Dec. 23, 2020.
CNIPA First Office Action for corresponding CN Application No. 201911097503.4; Issued on May 31, 2021.
EPO Extended European Search Report for corresponding EP Application No. 20883986.0; Issued Oct. 5, 2022.
Interdigital Inc., "On the impact of multi-beam operation on PDCCH structure", 3GPP TSG RAN WG1 Meeting #90, R1-1714148, Aug. 21-25, 2017, 5 pages.
Interdigital Inc., "On the impact of multi-beam operation on PDCCH structure", 3GPP TSG RAN WG1 NR Ad-Hoc#2, R1-1710944, Jun. 27-30, 2017, 5 pages.
KT Corp., "Considerations on NR PDCCH structure", 3GPP TSG RAN WG1 Meeting #89, R1-1709145, May 15-19, 2017, 3 pages.
Mediatek Inc., "On Initial Access Signals and Channels for NR-U", 3GPP TSG RAN WG1 #98bis, R1-1911049, Oct. 14-20, 2019, 6 pages.
Spreadtrum Communications, "Discussion on PDCCH repetition for URLLC", 3GPP TSG RAN WG1 Meeting #92, R1-1801840, Feb. 26-Mar. 2, 2018, 2 pages.
JPO Notice of Reasons for Refusal for corresponding JP Application No. JP2022-526412; Mailing date of Jun. 27, 2023.
Huawei, HiSilicon, "On NR-PDCCH structure"; 3GPP TSG RAN WG1 Meeting #90bis, R1-1717061; Prague, Czech Republic, Oct. 9-13, 2017; 13 pages.
KR 1st Office Action for corresponding KR Application No. 10-2022-7019161; Issued Nov. 27, 2024.
Panasonic, "The relation among RS REG, CCE, and CORESET", 3GPP TSG RAN WG1 Meeting #89, R1-1708108 , Hangzhou, P.R. China May 15-19, 2017; 5 pages.

* cited by examiner monitoring a PDCCH in a first type of CORESET, or a PDCCH in resources where CCE indexes are concatenated in a plurality of CORESETs — S101

PDCCH MONITORING AND APPARATUS, AND STORAGE MEDIUM AND TERMINAL

CROSS-REFERENCE TO RELATED APPLICATIONS

This is the U.S. national stage of application No. PCT/CN2020/115713, filed on Sep. 17, 2020. Priority under 35 U.S.C. § 119(a) and 35 U.S.C. § 365(b) is claimed from Chinese Application No. 201911097503.4, filed Nov. 8, 2019, the disclosure of which is also incorporated herein by reference.

TECHNICAL FIELD

The present disclosure generally relates to radio communication technology field, and more particularly, to a Physical Downlink Control Channel (PDCCH) monitoring method and apparatus, a storage medium and a terminal.

BACKGROUND

The 3rd Generation Partnership Project (3GPP) standards organization is studying on the Fifth-Generation mobile communications (5G) New Radio (NR) systems. Future NR standards may support narrowband User Equipment (UE), that is, UE with a bandwidth less than 100 MHz. This type of UE can be used for Machine Type Communication (MTC) or Internet of Thing (IoT). In addition, the NRs standards can also be used in licensed high-band scenarios or unlicensed high-band scenarios.

In 5G NR communication, further study is required on whether it is necessary to optimize signal transmission and reception of a PDCCH for different communication scenarios.

SUMMARY

Embodiments of the present disclosure may provide optimized PDCCH monitoring solutions.

In an embodiment of the present disclosure, a PDCCH monitoring method is provided, including: monitoring a PDCCH in a first type of Control Resource Set (CORESET), or a PDCCH in resources where Control Channel Element (CCE) indexes are concatenated in a plurality of CORESETs.

In an embodiment of the present disclosure, a storage medium having computer instructions stored therein is provided, wherein when the computer instructions are executed, the above method is performed.

In an embodiment of the present disclosure, a terminal including a memory and a processor is provided, wherein the memory has computer instructions stored therein, and when the processor executes the computer instructions, the above method is performed.

DETAILED DESCRIPTION

Figures 1, 2:
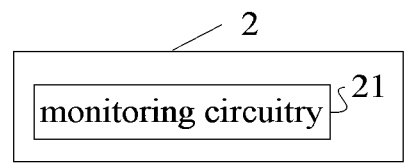
FIG. 1 is a flow chart of a PDCCH monitoring method according to an embodiment.
FIG. 2 is a structural diagram of a PDCCH monitoring apparatus according to an embodiment.

As described in the background, in 5G NR communication, further study is required on whether to optimize PDCCH transmission and reception to realize different applications.

Inventors found based on researches that PDCCH coverage needs to be enhanced in some communication scenarios. For example, in an IoT scenario, a Control Resource Set (CORESET) corresponding to a PDCCH is narrowband. As the narrowband CORESET has few resources, an aggregation level of the PDCCH is limited, thus, enhancement of the PDCCH coverage is required. For another example, in a high-frequency communication scenario, due to large signal fading, a signal-to-noise ratio decreases sharply with an increasing distance, thus, enhancement of the PDCCH coverage is also required. For another example, in an unlicensed spectrum of a high-frequency band, as channel bandwidth is relatively large and a transmission power in the unlicensed spectrum is limited by regulations, Power Spectral Density (PSD) becomes lower, and the coverage becomes narrower, thus, enhancement of the PDCCH coverage is also required.

In NR (5G system) Release 15 (Rel-15), a synchronization signal and a broadcast channel form a synchronization signal block, where a function of beam sweeping is introduced.

Through Primary Synchronization Signal (PSS) and Secondary Synchronization Signal (SSS), a UE obtains time-frequency synchronization of a cell and obtains a physical layer cell ID of the cell. This procedure is generally called for cell search.

PSS, SSS and Physical Broadcast Channel (PBCH) form an SS/PBCH block (synchronization signal block).

Each SS/PBCH block has a predetermined time domain position which may also be referred to as a candidate synchronization signal block. Multiple synchronization signal blocks form a Synchronization Signal burst (SS-burst). Multiple synchronization signal bursts form a Synchronization Signal burst set (SS-burst-set). Time domain positions of Lmax synchronization signal blocks are fixed within a 5 ms window. Indices of the time domain positions of the Lmax synchronization signal blocks are arranged consecutively, from 0 to Lmax-1. Therefore, a transmission moment of a synchronization signal block in this 5 ms window is fixed, and the index is also fixed.

Generally speaking, a base station transmits synchronization signal blocks by beam sweeping, that is, the base station transmits the synchronization signal blocks at different time domain positions through different beams. Accordingly, the UE may measure different beams and perceive at which beam a strongest signal is received.

Further, remaining minimum system information in Rel-15 NR includes main system information except MIB. RMSI may also be referred to as SIB1. RMSI is carried in a PDSCH which is scheduled through PDCCH. The PDSCH carrying the RMSI is generally referred to as an RMSI PDSCH, and the PDCCH scheduling the RMSI PDSCH is generally referred to as an RMSI PDCCH.

A search space set where the RMSI PDCCH is located is generally referred to as Type0-PDCCH search space set or Type0-PDCCH Common Search Space (CSS) set. Generally, the Type0-PDCCH CSS set may be configured by MIB, or by RRC (in a case of SIB1 reconfiguration or handover). A search space ID of the Type0-PDCCH CSS set may be configured as 0 (i.e., search space 0 or search space set 0), or non-zero. An ID of a CORESET bound to the Type0-PDCCH CSS set may be configured as 0 (i.e., CORESET0), or non-zero.

In addition to the search space set of RMSI PDCCH, other common search spaces or common search space sets include a search space set of OSI PDCCH (Type0A-PDCCH search space set or Type0A-PDCCH CSS set), a search space set of RAR PDCCH (Type1-PDCCH search space set or Type1-

PDCCH CSS set), and a search space set of paging PDCCH (Type2-PDCCH search space set or Type2-PDCCH CSS set). Their search space IDs may be configured to be 0 (i.e., search space 0 or search space set 0) or non-zero. IDs of CORESETs they are bound to may be configured to be 0 (i.e., CORESET0) or non-zero. Generally, the above-mentioned common search spaces or common search space sets may be reconfigured by SIB1.

RMSI PDCCH monitoring occasions are associated with the synchronization signal blocks. The UE obtains the association according to an RMSI PDCCH monitoring occasion table. During an initial access process, based on searching a certain synchronization signal block, the UE determines a time domain position (a starting symbol index or a first symbol index) of an RMSI PDCCH associated with the synchronization signal block according to a row index of the table indicated by a PBCH, thus, the RMSI PDCCH can be detected. Further, the UE receives and decodes the RMSI PDSCH based on RMSI PDCCH scheduling.

In Rel-15 NR, the UE decodes the RMSI PDCCH to obtain multiple bits allocated by time domain resources and searches a predefined table according to these bits to acquire a starting symbol index (also called a starting symbol number) and symbol length (or a duration) of the RMSI PDSCH.

Generally, a search space set includes properties such as a monitoring occasion and a search space type of the PDCCH. The search space set is generally bound to CORESET which includes properties such as frequency domain resources and a duration of the PDCCH.

In Rel-15 NR, a UE generally supports a bandwidth of 100 MHz. During initial access, the UE blindly detects PSS/SSS/PBCH in the synchronization signal block and acquires MIB and time index information carried in the PBCH. The UE acquires configuration of CORESET (also called CORESET0) and a search space set (called search space set 0) to which the PDCCH scheduling SIB1 (or RMSI) belongs through information in the MIB, and further monitors Type0-PDCCH which schedules a PDSCH carrying the SIB1 and decodes to acquire the SIB1. As bandwidth of CORESET0 is set through a table in PBCH, the maximum bandwidth of CORESET0 is implicitly defined in standards. Further, the standards specify that frequency domain resources of the PDSCH carrying SIB1 are within the bandwidth (PRB) of CORESET0, thus, the maximum bandwidth of the PDSCH carrying SIB1 is also implicitly defined in the standards.

In Rel-15 NR, the monitoring occasion of the PDCCH includes a period and an offset of monitoring at a slot level, a starting symbol in a slot, and the like. The PDCCH consists of one or more Control Channel Elements (CCEs). When the PDCCH consists of n CCEs, an aggregation level of the PDCCH is n, where n is a positive integer. The CCE consists of 6 Resource Element Groups (REGs). A REG is equal to one Resource Block (RB) during one symbol. The REGs within the CORESET are numbered in an increasing order in a time-first manner, starting with 0 for a first symbol and a lowest numbered resource block in the CORESET. Each CORESET is associated with one CCE-to-REG (CCE-to-REG) mapping. The CCE-to-REG mapping for the CORESET can be interleaved or non-interleaved and is described by REG bundles as follows:

(1) The i-th REG bundle is defined as REG and numbered as Resource Element Group (REG) $\{iL, iL+1, \ldots, iL+L-1\}$, where L is the number of REG bundles which is a positive integer, $i=0, 1, \ldots, N_{REG}^{CORESET}/L-1$, and $N_{REG}^{CORESET}=N_{RB}^{CORESET} \cdot N_{symb}^{CORESET}$, where $N_{REG}^{CORESET}$ is the number of REGs in the CORESET, $N_{RB}^{CORESET}$ represents the number of RBs in the CORESET, $N_{symb}^{CORESET}$ represents the number of symbols in the CORESET.

(2) The j-th CCE consists of REG bundles numbered $\{f(6j/L), f(6j/L+1), \ldots, f(6j/L+6/L-1)\}$, where $f(\cdot)$ represents an interleaves.

For non-interleaved CCE to REG mapping, L=6 and $f(x)=x$.

For interleaved CCE to REG mapping $L \in \{2,6\}$, when $N_{symb}^{CORESET}=1$, and $L \in \{N_{symb}^{CORESET}, 6\}$ or $N_{symb}^{CORESET} \in \{2,3\}$, the interleaver is defined as:

$$f(x)=(rC+c+n_{shift}) \bmod (N_{REG}^{CORESET}/L)$$

x=cR+r
r=0, 1, . . . , R−1
c=0, 1, . . . , C−1
$C=N_{REG}^{CORESET}/(LR)$, where, $R \in \{2, 3, 6\}$, $n_{shift}$ represents an offset coefficient of high-level configuration.

In embodiments of the present disclosure, a PDCCH monitoring method is provided, including: monitoring a PDCCH in a first type of CORESET, or a PDCCH in resources where CCE indexes are concatenated in a plurality of CORESETs. In the embodiments of the present disclosure, by increasing resources of the CORESET (for example, increasing a number of resource blocks in the CORESET), a PDCCH coverage is enhanced, which is conducive to improving a success probability of PDCCH reception by a terminal in scenarios, such as high-frequency licensed frequency band communication, high-frequency unlicensed frequency band communication, or IoT communication.

In order to clarify the objects, characteristics and advantages of the disclosure, embodiments of present disclosure will be described in detail in conjunction with accompanying drawings.

Technical solutions of the present disclosure are applicable to 5G communication systems, and other communication systems, such as 4G, 3G communication systems, or various communication systems subsequently evolved.

The technical solutions of the present disclosure are also applicable to different network architectures, including but not limited to a relay network architecture, a dual-link network architecture, or a Vehicle-to-Everything (V2X) communication architecture.

The base station in the embodiments of the present disclosure may also be referred to as a base station equipment, and is an apparatus deployed in a wireless access network to provide wireless communication functions. For example, an equipment that provides a base station function in a 2G network includes a Base Transceiver Station (BTS) and a Base Station Controller (BSC). An equipment that provides the base station function in a 3G network includes a Node B and a Radio Network Controller (RNC). An equipment that provides the base station function in a 4G network includes an evolved node B (eNB). In a Wireless Local Area Network (WLAN), an equipment that provides the base station function is an Access Point (AP). An equipment that provides the base station function in 5G New Radio (NR) includes a continuously evolved Node B (gNB). The base station also refers to an equipment that provides the base station function in a new communication system in the future.

A terminal (for example, a sending terminal and/or a receiving terminal) in the embodiments of the present disclosure may refer to various forms of UE, access terminal, user unit, user station, Mobile Station (MS), remote station, remote terminal, mobile equipment, user terminal, terminal equipment, wireless communication equipment, user agent or user device. The terminal equipment may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

It should be understood that the term "and/or" in the present disclosure is merely an association relationship describing associated objects, indicating that there can be three types of relationships, for example, A and/or B can represent "A exists only," both A and B exist, B exists only. In addition, the character "/" in the present disclosure represents that the former and latter associated objects have an "or" relationship.

The "plurality" in the embodiments of the present disclosure refers to two or more.

The "connection" in the embodiments of the present disclosure refers to various connection ways such as direct connection or indirect connection to realize communication between devices, which is not limited in the embodiments of the present disclosure.

Referring to FIG. 1, FIG. 1 is a flow chart of a PDCCH monitoring method according to an embodiment. The method is applied to 5G and subsequently evolved communication standards. The method may include S101.

In S101, a UE monitors a PDCCH in a first type of CORESET, or a PDCCH in resources where CCE indexes are concatenated in a plurality of CORESETs.

In some embodiments, a base station may send the PDCCH to the UE. The PDCCH may be sent through the first type of CORESET. In some embodiments, a number of resource blocks in the first type of CORESET may be greater than a number of resource blocks in a control resource set. Carrying PDCCH in the first type of CORESET may enable PDCCH coverage enhancement.

In S101, the UE may monitor the PDCCH in the first type of CORESET. The number of resource blocks in the first type of CORESET is greater than the number of resource blocks in the control resource set.

Generally, for a narrowband system, the number of resource blocks in the first type of CORESET may be 24. Therefore, frequency domain resources in the first type of CORESET are limited. More resources can be obtained through time domain spreading.

Generally, a number of symbols in one slot is 14. In this case, a number of symbols in the control resource set needs to be limited so as to be multiplexed with other signals/channels in one slot.

In an embodiment, a number of symbols in the first type of CORESET is six. In this case, one REG is equal to one resource block in one symbol. All REGs in the first type of CORESET are numbered incrementally in a time-first manner, and number 0 is a first symbol and a lowest indexed resource block in the first type of CORESET. The symbols in the embodiments of the present disclosure may be OFDM symbols, or DFT-spread-OFDM (DFT-s-OFDM) symbols, or symbols of other waveforms. When one REG is equal to one resource block in one symbol, generally, the symbol is an OFDM symbol, as for an OFDM symbol, PDCCH DMRS and PDCCH load can be multiplexed in one symbol. When one REG is equal to one resource block in multiple symbols, the symbol may be an OFDM symbol, a DFT-s-OFDM symbol, or a symbol of other waveforms.

A CCE includes 1 REG bundle which includes 6 REGs, or a CCE includes 2 REG bundles each of which includes 3 REGs, or a CCE includes 3 REG bundles each of which includes 2 REGs.

Specifically, when the number of resource blocks in the first type of CORESET is 24, the first type of CORESET includes 24 CCEs, and the CCE includes 6 REGs. It can be seen that the number of CCEs is increased.

In some embodiments, the number of symbols in the first type of CORESET is 12. In this case, one REG is equal to one resource block in one symbol. All REGs in the first type of CORESET are numbered incrementally in a time-first manner, and number 0 is a first symbol and a lowest indexed resource block in the first type of CORESET.

The CCE includes 1 REG bundle which includes 12 REGs.

Specifically, when the number of resource blocks in the first type of CORESET is 24, the first type of CORESET includes 24 CCEs, and the CCE includes 12 REGs. Further, if the number of symbols in the control resource set is 2, and the number of symbols in the first type of CORESET is 12, the first type of CORESET and the control resource set can occupy a same slot.

In some embodiments, the number of symbols in the first type of CORESET is 11. In this case, one REG is equal to one resource block in one symbol. All REGs in the first type of CORESET are numbered incrementally in a time-first manner, and number 0 is a first symbol and a lowest indexed resource block in the first type of CORESET.

The CCE includes 1 REG bundle which includes 11 REGs.

Specifically, when the number of resource blocks in the first type of CORESET is 24, the first type of CORESET includes 24 CCEs, and the CCE includes 11 REGs. It can be seen that the number of CCEs is increased. Further, if the number of symbols in the control resource set is 3, and the number of symbols in the first type of CORESET is 11, the first type of CORESET and the control resource set can occupy a same slot.

In some embodiments, the number of symbols in the first type of CORESET is 9. In this case, one REG is equal to one resource block in one symbol. All REGs in the first type of CORESET are numbered incrementally in a time-first manner, and number 0 is a first symbol and a lowest indexed resource block in the first type of CORESET.

The CCE includes 1 or 2 REG bundles each of which includes 9 REGs.

Specifically, when the number of resource blocks in the first type of CORESET is 24, the first type of CORESET includes 24 CCEs, and the CCE includes 9 or 18 REGs. It can be seen that the number of CCEs is increased.

In some embodiments, the number of symbols in the first type of CORESET is 12. In this case, one REG is equal to one resource block in one symbol. All REGs in the first type of CORESET are numbered incrementally in a time-first manner, and number 0 is a first symbol and a lowest indexed resource block in the first type of CORESET.

The CCE includes 3 REG bundles each of which includes 2 REGs. Or the CCE includes 2 REG bundles each of which includes 3 REGs. Or the CCE includes 1 REG bundle which includes 6 REGs.

Specifically, when the number of resource blocks in the first type of CORESET is 24, the first type of CORESET includes 48 CCEs, and the CCE includes 6 REGs. It can be seen that the number of CCEs is increased.

In some embodiments, the number of symbols in the first type of CORESET is 4. In this case, one REG is equal to one resource block in one symbol. All REGs in the first type of CORESET are numbered incrementally in a time-first manner, and number 0 is a first symbol and a lowest indexed resource block in the first type of CORESET.

The CCE includes 1 REG bundle which includes 4 REGs.

Specifically, when the number of resource blocks in the first type of CORESET is 24, the first type of CORESET includes 24 CCEs, and the CCE includes 4 REGs. It can be seen that the number of CCEs is increased.

In some embodiments, the number of symbols in the first type of CORESET is 8. In this case, one REG is equal to one resource block in one symbol. All REGs in the first type of CORESET are numbered incrementally in a time-first manner, and number 0 is a first symbol and a lowest indexed resource block in the first type of CORESET.

The CCE includes 1 REG bundle which includes 8 REGs.

Specifically, when the number of resource blocks in the first type of CORESET is 24, the first type of CORESET includes 24 CCEs, and the CCE includes 8 REGs. It can be seen that the number of CCEs is increased.

In some embodiments, the number of symbols in the first type of CORESET is 4. In this case, one REG is equal to one resource block in one symbol. All REGs in the first type of CORESET are numbered incrementally in a time-first manner, and number 0 is a first symbol and a lowest indexed resource block in the first type of CORESET.

The CCE includes 2 or 3 REG bundles each of which includes 2 REGs.

Specifically, when the number of resource blocks in the first type of CORESET is 24, the first type of CORESET includes 32 or 48 CCEs, and the CCE includes 4 or 6 REGs. It can be seen that the number of CCEs is increased.

In some embodiments, the number of symbols in the first type of CORESET is 8. In this case, one REG is equal to one resource block in one symbol. All REGs in the first type of CORESET are numbered incrementally in a time-first manner, and number 0 is a first symbol and a lowest indexed resource block in the first type of CORESET.

The CCE includes 2 or 3 REG bundles each of which includes 4 REGs.

Specifically, when the number of resource blocks in the first type of CORESET is 24, the first type of CORESET includes 32 or 48 CCEs, and the CCE includes 8 or 12 REGs.

In some embodiments, the number of symbols in the first type of CORESET is 8. In this case, one REG is equal to one resource block in one symbol. All REGs in the first type of CORESET are numbered incrementally in a time-first manner, and number 0 is a first symbol and a lowest indexed resource block in the first type of CORESET.

The CCE includes 2 or 3 REG bundles each of which includes 2 REGs.

Specifically, when the number of resource blocks in the first type of CORESET is 24, the first type of CORESET includes 64 or 96 CCEs, and the CCE includes 4 or 6 REGs. It can be seen that the number of CCEs is increased.

In a high-frequency band, the number of symbols in one slot may exceed 14, where the number of symbols in the control resource set can be adaptively increased.

In some embodiments, the number of symbols in the first type of CORESET is 8. In this case, one REG is equal to one resource block in one symbol. All REGs in the first type of CORESET are numbered incrementally in a time-first manner, and number 0 is a first symbol and a lowest indexed resource block in the first type of CORESET.

The CCE includes 6 REG bundles each of which includes 8 REGs.

In some embodiments, the number of symbols in the first type of CORESET is 16. In this case, one REG is equal to one resource block in one symbol. All REGs in the first type of CORESET are numbered incrementally in a time-first manner, and number 0 is a first symbol and a lowest indexed resource block in the first type of CORESET.

The CCE includes 48 REGs. The CCE includes 3 REG bundles each of which includes 16 REGs. Alternatively, the CCE includes 6 REG bundles each of which includes 8 REGs. Alternatively, the CCE includes 12 REG bundles each of which includes 4 REGs. Alternatively, the CCE includes 24 REG bundles each of which includes 2 REGs.

In some embodiments, the number of symbols in the first type of CORESET is 18. In this case, one REG is equal to one resource block in one symbol. All REGs in the first type of CORESET are numbered incrementally in a time-first manner, and number 0 is a first symbol and a lowest indexed resource block in the first type of CORESET.

The CCE includes 1 REG bundle which includes 6 REGs.

PDCCH DMRS and PDCCH load can adopt time division multiplexing. In this case, there may be a single symbol in a REG as PDCCH DMRS. That is, one REG includes at least two symbols.

In some embodiments, one REG is equal to one resource block in two symbols. All REGs in the first type of CORESET are numbered incrementally in a time-first manner, and number 0 is a first symbol and a lowest indexed resource block in the first type of CORESET. One symbol in the REG is PDCCH DMRS.

In some embodiments, the number of symbols in the first type of CORESET is 2, and one REG bundle includes one REG.

In some embodiments, the number of symbols in the first type of CORESET is 4, and one REG bundle includes 2 REGs.

In some embodiments, the number of symbols in the first type of CORESET is 6, and one REG bundle includes 3 REGs.

In some embodiments, the number of symbols in the first type of CORESET is 8, and one REG bundle includes 4 REGs.

In some embodiments, the number of symbols in the first type of CORESET is 12, and one REG bundle includes 6 REGs.

In some embodiments, one REG is equal to one resource block in three symbols. All REGs in the first type of CORESET are numbered incrementally in a time-first manner, and number 0 is a first symbol and a lowest indexed resource block in the first type of CORESET. One symbol in the REG is PDCCH DMRS.

In some embodiments, the number of symbols in the first type of CORESET is 3, and one REG bundle includes one REG.

In some embodiments, the number of symbols in the first type of CORESET is 6, and one REG bundle includes 2 REGs.

In some embodiments, the number of symbols in the first type of CORESET is 12, and one REG bundle includes 4 REGs.

In some embodiments, one REG is equal to one resource block in four symbols. All REGs in the first type of CORESET are numbered incrementally in a time-first manner, and number 0 is a first symbol and a lowest indexed resource block in the first type of CORESET. One symbol in the REG is PDCCH DMRS.

In some embodiments, the number of symbols in the first type of CORESET is 4, and one REG bundle includes one REG.

In some embodiments, the number of symbols in the first type of CORESET is 8, and one REG bundle includes 2 REGs.

In some embodiments, the number of symbols in the first type of CORESET is 12, and one REG bundle includes 3 REGs.

In some embodiments, the number of symbols in the first type of CORESET is 16, and one REG bundle includes 4 REGs.

In some embodiments, the UE may monitor a PDCCH in resources where CCE indexes are concatenated in a plurality of CORESETs. Optionally, CCE indexes being concatenated in the plurality of CORESETs may be numbers of CCE being sequentially arranged in the plurality of CORESETs. A candidate PDCCH may include one or more concatenated CCEs. The UE determines an order in which the numbers of the CCEs in the plurality of CORESETs are arranged, where the order is indicated by signaling. According to an order of the plurality of CORESETs, the UE determines that the numbers of the CCEs in the plurality of CORESETs increase in the order of the plurality of CORESETs. The order of the plurality of CORESETs is indicated by signaling.

In some embodiments, the number of symbols (also known as a duration, or duration symbols) of the CORESET may be spread. The embodiments of the present disclosure are described in detail below with specific examples.

In some embodiments, the first type of CORESET may be used in a narrowband system. In this case, the first type of CORESET has a small bandwidth, for example, a number of RBs in the first type of CORESET is 24. Under this condition, the first type of CORESET may be generated in a manner of any one of following embodiments.

In an embodiment, the number of symbols in the first type of CORESET is 6. One REG bundle includes 6 REGs. One CCE includes one REG bundle. When CORESET includes 24 RBs, 24 CCEs are included.

In an embodiment, the number of symbols in the first type of CORESET is 12. One REG bundle includes 12 REGs. One CCE includes one REG bundle. When CORESET includes 24 RBs, 24 CCEs are included. It is suitable for coexistence with a CORESET with a symbol number of 2, that is, the first type of CORESET with a symbol number of 12 and the CORESET with the symbol number of 2 include 14 symbols totally which exactly constitute one slot, and thus occupy the same slot.

In an embodiment, the number of symbols in the first type of CORESET is 11. One REG bundle includes 11 REGs. One CCE includes one REG bundle. When CORESET includes 24 RBs, 24 CCEs are included. It is suitable for coexistence with a CORESET with a symbol number of 3, that is, the first type of CORESET with a symbol number of 11 and the CORESET with the symbol number of 3 include 14 symbols totally which exactly constitute one slot, and thus occupy the same slot.

In an embodiment, the number of symbols in the first type of CORESET is 9. One REG bundle includes 9 REGs. One CCE includes one or two REG bundles. When CORESET includes 24 RBs, 24 CCEs are included.

In an embodiment, the number of symbols in the first type of CORESET is 6. One REG bundle includes 2 or 3 REGs. One CCE includes 3 or 2 REG bundles. When CORESET includes 24 RBs, 24 CCEs are included.

In an embodiment, the number of symbols in the first type of CORESET is 12. One REG bundle includes 2 or 3 or 6 REGs. One CCE includes 3 or 2 or 1 REG bundles. When the first type of CORESET includes 24 RBs, 48 CCEs are included.

In an embodiment, the number of symbols in the first type of CORESET is 4. One REG bundle includes 4 REGs. One CCE includes one REG bundle. When the first type of CORESET includes 24 RBs, 24 CCEs are included.

In an embodiment, the number of symbols in the first type of CORESET is 8. One REG bundle includes 8 REGs. One CCE includes one REG bundle. When CORESET includes 24 RBs, 24 CCEs are included.

In an embodiment, the number of symbols in the first type of CORESET is 4. One REG bundle includes 2 REGs. One CCE includes 2 or 3 REG bundles. When the first type of CORESET includes 24 RBs, 48 or 32 CCEs are included.

In an embodiment, the number of symbols in the first type of CORESET is 8. One REG bundle includes 4 REGs. One CCE includes 2 or 3 REG bundles. When the first type of CORESET includes 24 RBs, 48 or 32 CCEs are included.

In an embodiment, the number of symbols in the first type of CORESET is 8. One REG bundle includes 2 REGs. One CCE includes 2 or 3 REG bundles. When the first type of CORESET includes 24 RBs, 96 or 64 CCEs are included.

In some embodiments, the first type of CORESET may be used in high-frequency bands, and the number of symbols in one slot may exceed 14. In this case, the method of following three embodiments may be adopted.

In an embodiment, the number of symbols in the first type of CORESET is 8. One REG bundle includes 8 REGs. One CCE includes 6 REG bundles. In this case, one CCE includes 48 REGs which is 8 times of an original CCE (for example, the CCE in NR Rel-15), which may increase the number of REGs of the PDCCH under the same aggregation level to 8 times of the original.

In an embodiment, the number of symbols in the first type of CORESET is 16. One REG bundle includes 2 or 4 or 8 or 16 REGs. One CCE includes 24 or 12 or 6 or 3 REG bundles. In this case, one CCE includes 48 REGs which is 8 times of an original CCE (for example, the CCE in NR Rel-15), which may increase the number of REGs of the PDCCH under the same aggregation level to 8 times of the original.

In an embodiment, the number of symbols in the first type of CORESET is 18. One REG bundle includes 6 REGs. One CCE includes 1 REG bundle. In this case, the total number of the REG bundles increases to 6 times of that of a CORESET with a symbol number of 3.

In some embodiments, the first type of CORESET may be used in a scenario where a high-frequency band is adopted, signals have a DFT-s-OFDM waveform, and PDCCH DMRS and PDCCH payload adopt time-division multiplexing. In this case, the number of symbols in one slot may exceed 14. When the first type of CORESET is used in a high-frequency band, the method of following three embodiments may be adopted.

In an embodiment, the number of symbols in the first type of CORESET is 2. One REG incudes 1 RB of 2 symbols. One symbol in the REG is PDCCH DMRS. One REG bundle includes 1 REG. When the number of symbols in the first type of CORESET is 4, 1 REG bundle includes 2 REGs. When the number of symbols in the first type of CORESET is 6, one REG bundle includes 3 REGs. When the number of symbols in the first type of CORESET is 8, one REG bundle includes 4 REGs. When the number of symbols in the first type of CORESET is 12, one REG bundle includes 6 REGs.

In an embodiment, the number of symbols in the first type of CORESET is 3. One REG includes 1 RB of 3 symbols. One symbol in the REG is PDCCH DMRS. One REG bundle includes 1 REG. When the number of symbols in the first type of CORESET is 6, one REG bundle includes 2 REGs. When the number of symbols in the first type of CORESET is 12, one REG bundle includes 4 REGs.

In an embodiment, the number of symbols in the first type of CORESET is 4. One REG includes 1 RB of 4 symbols. One symbol in the REG is PDCCH DMRS. One REG bundle includes 1 REG. When the number of symbols in the first type of CORESET is 8, one REG bundle includes 2 REGs. When the number of symbols in the first type of CORESET is 12, one REG bundle includes 3 REGs. When the number of symbols in the first type of CORESET is 16, one REG bundle includes 4 REGs.

It should be noted that reasons why the UE can monitor the first type of CORESET to achieve PDCCH coverage enhancement include a base station on a network side using the first type of CORESET to send the PDCCH. During narrowband communication or high-frequency band communication, the numbers of REGs, CCEs, and REG bundles included in the first type of CORESET adopted by the base station may be referred to the technical solutions as shown in FIG. 1, which are not repeated here.

From above, the embodiments of the present disclosure provide various solutions relevant to the first type of CORESET for PDCCH coverage enhancement, which may realize spreading of the number of symbols, the duration or continuous symbols of the CORESET, thereby realizing the PDCCH coverage enhancement.

FIG. 2 is a structural diagram of a PDCCH monitoring apparatus according to an embodiment. The PDCCH monitoring apparatus 2 may perform the method as shown in FIG. 1 and be applied to a UE.

In some embodiments, the PDCCH monitoring apparatus 2 includes: a monitoring circuitry 21 configured to monitor a PDCCH in a first type of CORESET, or a PDCCH in resources where CCE indexes are concatenated in a plurality of CORESETs.

Working principles and modes of the PDCCH monitoring apparatus 2 may be referred to the above descriptions of FIG. 1 and are not described in detail here.

In an embodiment of the present disclosure, a storage medium having computer instructions stored therein is provided, wherein when the computer instructions are executed, any one of the above methods as shown in FIG. 1 is performed. In some embodiments, the storage medium may be a computer readable storage medium and may include a non-volatile or a non-transitory memory, or include a ROM, a RAM, a magnetic disk or an optical disk.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor, or the processor may be any conventional processor or the like.

It should also be understood that the memory in the embodiments of the present disclosure may be either volatile memory or nonvolatile memory or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

The above embodiments may be implemented in whole or in part by software, hardware, firmware or any combination thereof. When implemented in software, the above embodiments may be implemented in whole or in part in the form of a computer program product. The computer program product includes one or more computer instructions or computer programs. The procedures or functions according to the embodiments of the present disclosure are wholly or partially generated when the computer instructions or the computer programs are loaded or executed on a computer. The computer may be a general purpose computer, a special purpose computer, a computer network, or other programmable device. The computer instructions may be stored in a computer readable storage medium or transmitted from one computer readable storage medium to another computer readable storage medium, for example, the computer instructions may be transmitted from one website, computer, server or data center to another website, computer, server or data center by wire (e.g., infrared, wireless, microwave and etc.). The computer readable storage medium may be any available medium that can be accessed by a computer or a data storage device such as a server or a data center that contains one or more sets of available media. The available medium may be a magnetic medium (e.g., floppy disk, hard disk or magnetic tape), an optical medium (e.g., DVD), or a semiconductor medium. The semiconductor medium may be a solid disk.

It should be understood that, in the various embodiments of the present disclosure, sequence numbers of the above-mentioned processes do not represent an execution sequence, and the execution sequence of each process should be determined by its function and inherent logic, which does not limit an implementation process of the embodiments of the present disclosure.

In the above embodiments of the present disclosure, it should be understood that the disclosed method, apparatus and system may be implemented in other ways. For example, the above device embodiments are merely illustrative, and for example, division of units is merely one logical division, and other divisions may be realized in practice, for example, a plurality of units or components may be combined or integrated into another system, or some features may be omitted, or not executed. Further, the shown or discussed mutual coupling or direct coupling or communication connection may be an indirect coupling or communication connection via some interfaces, devices or units, and may be in an electrical, mechanical or other form.

The units described as separate parts may or may not be physically separate, and parts shown as units may or may not be physical units, that is, may be disposed in one place, or may be distributed on a plurality of network units. Some or all of the units can be selected according to practical requirements to achieve the purpose of the solutions of the embodiments.

In addition, functional units in the embodiments of the present disclosure may be integrated in one processing unit, or each unit may be physically separate, or two or more units may be integrated in one unit. The integrated units can be realized in a form of hardware, or in a form of hardware plus a software functional unit.

The integrated units implemented in the form of the software functional unit may be stored in a computer readable storage medium. The software functional unit is stored in a storage medium and includes several instructions for causing a computer device (a personal computer, a server or a network device) to execute some steps of the methods in the embodiments of the present disclosure. And the storage medium may be a medium for storing program codes, such as a U disk, a removable hard disk, a ROM, a RAM, a magnetic disk or an optical disk.

In an embodiment of the present disclosure, a terminal including a memory and a processor is provided, wherein the memory has computer instructions stored therein, and when the processor executes the computer instructions, the above method as shown in FIG. 1 is performed. The terminal may be an NR UE.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A Physical Downlink Control Channel (PDCCH) monitoring method, comprising:
    monitoring a PDCCH in a first type of Control Resource Set (CORESET), thereby optimizing PDCCH reception,
    wherein when a number of symbols in the first type of CORESET is 4, a Resource Element Group (REG) bundle consists of four REGs, and each of the four REGs comprises one Resource Block (RB) in one symbol.

2. The method according to claim 1, further comprising:
    monitoring the PDCCH in resources where Control Channel Element (CCE) indexes are concatenated in a plurality of CORESETs, wherein the resources where the CCE indexes are concatenated in the plurality of CORESETs are resources where serial numbers of CCEs are sequentially arranged in the plurality of CORESETs.

3. A non-transitory storage medium storing one or more programs, the one or more programs comprising computer instructions, which, when executed by a processor, cause the processor to:
    monitor a PDCCH in a first type of Control Resource Set (CORESET), thereby optimizing PDCCH reception,
    wherein when a number of symbols in the first type of CORESET is 4, a Resource Element Group (REG) bundle consists of four REGs, and each of the four REGs comprises one Resource Block (RB) in one symbol.

4. A terminal comprising: a memory; and a processor, wherein the memory stores one or more programs, the one or more programs comprising computer instructions, which, when executed by the processor, cause the processor to:
    monitor a PDCCH in a first type of Control Resource Set (CORESET), thereby optimizing PDCCH reception,
    wherein when a number of symbols in the first type of CORESET is 4, a Resource Element Group (REG) bundle consists of four REGs, and each of the four REGs comprises one Resource Block (RB) in one symbol.

* * * * *